US006918830B2

(12) United States Patent
Baerlocher

(10) Patent No.: US 6,918,830 B2
(45) **Date of Patent: *Jul. 19, 2005**

(54) GAMING DEVICE HAVING GAME SCHEME ALLOWING PLAYER SKILL TO AFFECT SYMBOL MOVEMENT WITHOUT AFFECTING AWARD

(75) Inventor: Anthony J. Baerlocher, Reno, NV (US)

(73) Assignee: IGT, Reno, NV (US)

(*) Notice: Subject to any disclaimer, the term of this patent is extended or adjusted under 35 U.S.C. 154(b) by 5 days.

This patent is subject to a terminal disclaimer.

(21) Appl. No.: 10/408,606

(22) Filed: Apr. 7, 2003

(65) Prior Publication Data

US 2003/0190946 A1 Oct. 9, 2003

Related U.S. Application Data

(63) Continuation of application No. 09/684,535, filed on Oct. 6, 2000, now Pat. No. 6,572,473.

(51) Int. Cl.[7] .................................................. A63F 13/10
(52) U.S. Cl. ....................................... 463/16; 273/138.1
(58) Field of Search ................................ 463/7, 16–20, 463/36–37; 273/138.1, 139, 141 R, 141 A, 142 R, 143 R, 142 A–142 D, 142 H, 142 HA, 142 J

(56) References Cited

U.S. PATENT DOCUMENTS

| | | | | |
|---|---|---|---|---|
| 4,582,324 A | | 4/1986 | Koza et al. | |
| 4,618,150 A | * | 10/1986 | Kimura | 273/143 R |
| 4,695,053 A | | 9/1987 | Vazquez, Jr. et al. | |

(Continued)

FOREIGN PATENT DOCUMENTS

| | | | |
|---|---|---|---|
| EP | 375190 A2 * | 6/1990 | G07F/17/34 |
| EP | 0688002 A1 | 12/1995 | |
| WO | WO 00/12186 | 3/2000 | |

OTHER PUBLICATIONS

Slotto Article by Strictly Slots, dated in the year 2001, on or before Dec. thereof.
Reel em In—Cast for Cash Brochure & Website published by WMS Gaming, Inc., dated in the year 2001, on or before Dec. thereof.
Winning Bid Brochure published by WMS Gaming, Inc., dated in the year 2001, on or before Dec. thereof.
Introducing The Hottest Video Games on the Nile written by Aristocrat Technologies, published Oct., 2000.
Cash Chameleon Article written by Aristrocrat Technologies, published Apr., 2001.
Tickets'n'Tunes from www.rgb.com printed on Feb. 28, 2002.
Primetime Amusements Redemption Games from www.primetimeamusements.com printed on Feb. 28, 2002.
Weiner Distributing ICE Cyclone™ from www.winerd.com. printed on Feb. 28, 2002.
Mountain Coin Machine Distributing—Redemption Games—Cyclone™ from www.mountaincoin.com printed Feb. 28, 2002.

*Primary Examiner*—Scott E. Jones
(74) *Attorney, Agent, or Firm*—Bell, Boyd & Lloyd LLC

(57) ABSTRACT

The present invention involves a gaming device with a bonus scheme which includes a plurality of parent regions and sub-regions. The gaming device moves at least one symbol with respect to the sub-regions and enables the player to use his/her skill to stop the symbol and indicate a sub-region within a parent region. Which sub-region the symbol will indicate within such parent region is determined by the gaming device, preferably unbeknownst to the player. The gaming device preferably awards the player with value associated with the sub-region which is indicated by the stopped symbol. This type of game provides players with skill-based activities thereby adding excitement to gaming devices and increasing player entertainment.

111 Claims, 6 Drawing Sheets

U.S. PATENT DOCUMENTS

| | | | | | |
|---|---|---|---|---|---|
| 4,743,024 | A | * | 5/1988 | Helm et al. | 273/143 R |
| 4,773,647 | A | * | 9/1988 | Okada et al. | 273/143 R |
| 5,342,047 | A | | 8/1994 | Heidel et al. | |
| 5,342,049 | A | | 8/1994 | Wichinsky et al. | |
| 5,393,061 | A | | 2/1995 | Manship et al. | |
| 5,524,888 | A | | 6/1996 | Heidel | |
| 5,766,074 | A | | 6/1998 | Cannon et al. | |
| 5,772,509 | A | | 6/1998 | Weiss | |
| 5,788,573 | A | | 8/1998 | Baerlocher et al. | |
| 5,823,874 | A | | 10/1998 | Adams | |
| 5,848,932 | A | | 12/1998 | Adams | |
| 5,882,261 | A | | 3/1999 | Adams | |
| 5,910,046 | A | | 6/1999 | Wada et al. | |
| 5,911,418 | A | | 6/1999 | Adams | |
| 5,941,770 | A | | 8/1999 | Miers et al. | |
| 6,015,346 | A | | 1/2000 | Bennett | |
| 6,019,369 | A | | 2/2000 | Nakagawa et al. | |
| 6,050,895 | A | | 4/2000 | Luciano, Jr. et al. | |
| 6,056,642 | A | | 5/2000 | Bennett | |
| 6,071,192 | A | | 6/2000 | Weiss | |
| 6,089,976 | A | | 7/2000 | Schneider et al. | |
| 6,089,977 | A | | 7/2000 | Bennett | |
| 6,089,978 | A | | 7/2000 | Adams | |
| 6,102,798 | A | | 8/2000 | Bennett | |
| 6,110,039 | A | | 8/2000 | Oh | |
| 6,110,041 | A | | 8/2000 | Walker et al. | |
| 6,117,007 | A | | 9/2000 | Matsuyama et al. | |
| 6,117,008 | A | | 9/2000 | Machiguchi | |
| 6,126,165 | A | | 10/2000 | Sakamoto | |
| 6,135,884 | A | | 10/2000 | Hedrick et al. | |
| 6,142,873 | A | | 11/2000 | Weiss et al. | |
| 6,142,874 | A | | 11/2000 | Kodachi et al. | |
| 6,159,094 | A | | 12/2000 | Gura | |
| 6,159,095 | A | | 12/2000 | Frohm et al. | |
| 6,165,070 | A | | 12/2000 | Nolte et al. | |
| 6,174,233 | B1 | | 1/2001 | Sunaga et al. | |
| 6,174,234 | B1 | * | 1/2001 | Seibert et al. | 463/20 |
| 6,174,235 | B1 | | 1/2001 | Walker et al. | |
| 6,190,255 | B1 | | 2/2001 | Thomas et al. | |
| 6,231,442 | B1 | | 5/2001 | Mayeroff | |
| 6,231,445 | B1 | | 5/2001 | Acres | |
| 6,251,013 | B1 | | 6/2001 | Bennett | |
| 6,261,177 | B1 | | 7/2001 | Bennett | |
| 6,270,411 | B1 | | 8/2001 | Gura et al. | |
| 6,287,194 | B1 | | 9/2001 | Okada et al. | |
| 6,302,790 | B1 | | 10/2001 | Brossard | |
| 6,315,660 | B1 | | 11/2001 | Demar et al. | |
| 6,488,580 | B1 | | 12/2002 | Robb | |
| 6,537,150 | B1 | | 3/2003 | Luciano et al. | |

* cited by examiner

| PARENT REGIONS | SUB-REGION 1 P | SUB-REGION 1 V | SUB-REGION 2 P | SUB-REGION 2 V | SUB-REGION 3 P | SUB-REGION 3 V | EXPECTED VALUE |
|---|---|---|---|---|---|---|---|
| A | 10% | 100 | 30% | 40 | 60% | 20 | 34.00 |
| B | 10% | 90 | 30% | 60 | 60% | 12 | 34.20 |
| C | 5% | 400 | 20% | 30 | 75% | 11 | 34.25 |
| D | 2% | 1,500 | 40% | 7 | 58% | 2 | 33.96 |

GAMING DEVICE HAVING GAME SCHEME ALLOWING PLAYER SKILL TO AFFECT SYMBOL MOVEMENT WITHOUT AFFECTING AWARD

PRIORITY CLAIM

This application is a continuation of and claims priority to and the benefit of U.S. patent application Ser. No. 09/684,535, filed Oct. 6, 2000, now U.S. Pat. No. 6,572,473.

CROSS REFERENCES TO RELATED APPLICATIONS

This application is related to the following commonly-owned co-pending patent applications: "GAMING DEVICE HAVING SKILL/PERCEIVED SKILL BONUS ROUND," Ser. No. 09/682,407, "GAMING DEVICE HAVING A MULTIPLE ROUND GAME THAT INCLUDES PLAYER CHOICES AND PROCESSOR CHOICES," Ser. No. 09/966,855, and "GAMING DEVICE HAVING PERCEIVED SKILL," Ser. No. 09/682,408.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device which has a game scheme which involves symbol movement and allows a player's skill to influence such movement without influencing a player's award.

BACKGROUND OF THE INVENTION

Traditional gaming machines, such as slot machines, include a plurality of reels and each reel has upon it a plurality of symbols. When the player pushes a button the reels rotate and where they stop, relative to one another, determines whether or not the player gains value. Other gaming devices include spinning wheels which are divided into a plurality of pie-shaped areas. The wheel rotates with respect to a pointer. Depending upon which area stops at the pointer, the player may or may not gain value. Still other gaming devices involve bonus rounds which are often video-based. The bonus schemes vary from gaming device to gaming device and generally involve a variety of game scenarios.

In gaming devices, unlike arcade games, a player's success is not based upon skill. Gaming devices are programmed or set to randomly pay back a certain percentage. Having a gaming device truly based on skill would open the door to players becoming professionals at such games. Gaming devices of skill would also prejudice unskilled players, and unskilled players would be reluctant to play such games. Even though certain gaming devices such as video poker or blackjack involve certain skill and decision-making, their outcomes ultimately turn upon mathematics and probability. Accordingly, to increase player enjoyment and excitement, it is desirable to provide players with new gaming devices and game schemes wherein the player's success appears to be determined by the player's skill.

SUMMARY OF THE INVENTION

The present invention overcomes the above shortcomings by providing a gaming device having a game scheme which includes a plurality of parent regions and sub-regions. The term parent region, as used herein, includes any area or space which includes within it two or more sub-regions. Likewise, a sub-region is an area or space located within a parent region. The parent regions are preferably adjoined, however, they can be separated. The gaming device moves a symbol and uses the symbol to indicate a particular sub-region. Preferably, the gaming device moves the symbol along the sub-regions. Preferably, the gaming device does not display the parent regions to the player, but rather only displays the sub-regions to the player.

In addition, an award is associated with one or more of the sub-regions. The term award, as used herein, means a value or an opportunity to gain value. Such opportunities can involve bonus rounds or additional plays. Furthermore, the gaming device informs the player of the sub-regions which are associated with these awards. Preferably, the awards vary from sub-region to sub-region. It is expected that the player will seek to stop the symbol at the sub-region associated with the highest award.

In operation, the player activates an input device while the symbol is moving and indicating one or more sub-regions within a particular parent region. The gaming devices enables the symbol to continue moving so as to indicate a sub-region within the upcoming parent region where the gaming device stops the symbol from moving. The gaming device uses a predetermined mathematical calculation to determine where the symbol stops and which sub-region is indicated.

This calculation involves associating a stop probability with each sub-region within a parent region. The stop probability is the probability that the symbol will stop and indicate a particular sub-region. The sum of the stop probabilities for all of the sub-regions in a particular parent region is one hundred percent. For example, a parent region may include three sub-regions (sub-region one, sub-region two and sub-region three). Sub-region one may be associated with a relatively low award, sub-region two may be associated with a moderate award and sub-region three may be associated with a relatively high award. The gaming device may associate a seventy percent stop probability with sub-region one, a twenty-five percent stop probability with sub-region two and a five percent stop probability with sub-region three. As such, there is a relatively high probability that the player will reach a relatively low award and a relatively low probability that the player will reach a relatively high award.

Preferably, the awards include values but could also include advancement to a bonus round. These values are associated with each sub-region within a parent region and are preferably displayed to the player. It is also preferable that each such parent region has the same or substantially the same expected value. The expected value is the sum of the product of the stop probabilities and values associated with each sub-region. It is expected that the player will pursue the highest value by attempting to stop the symbol and indicate the sub-region associated with the highest value. When the player attempts to do so, the player can use his or her skill to stop the moving symbol and indicate a sub-region within a particular parent region. However, the player cannot use his or her skill to determine which sub-region the symbol will indicate. Rather, as discussed above, which sub-region the symbol indicates is determined by a mathematical calculation used by the gaming device.

The game scheme of the present invention displays a plurality of sub-regions to players and informs players of various awards associated with these sub-regions. The gaming scheme also includes a symbol which moves with respect to the sub-regions, and where the symbol stops preferably determines which award is provided to the player. Furthermore, the gaming device enables the player to cause the symbol to stop moving. This type of game scheme is intriguing to players because it involves the skill of timing a moving symbol so that it stops at a desired location. Although the gaming device enables players to use their skills to cause the symbol to stop moving, it does not enable players to use their skills to stop the symbol and indicate a particular sub-region. Rather, the gaming device enables players to use their skills to stop the symbol and indicate a sub-region within a particular parent region, and which sub-region the symbol indicates is determined by a mathematical calculation made by the gaming device.

It is therefore an object of the present invention to provide a gaming device having a game scheme which allows a player's skill to affect symbol movement without affecting a player's award.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
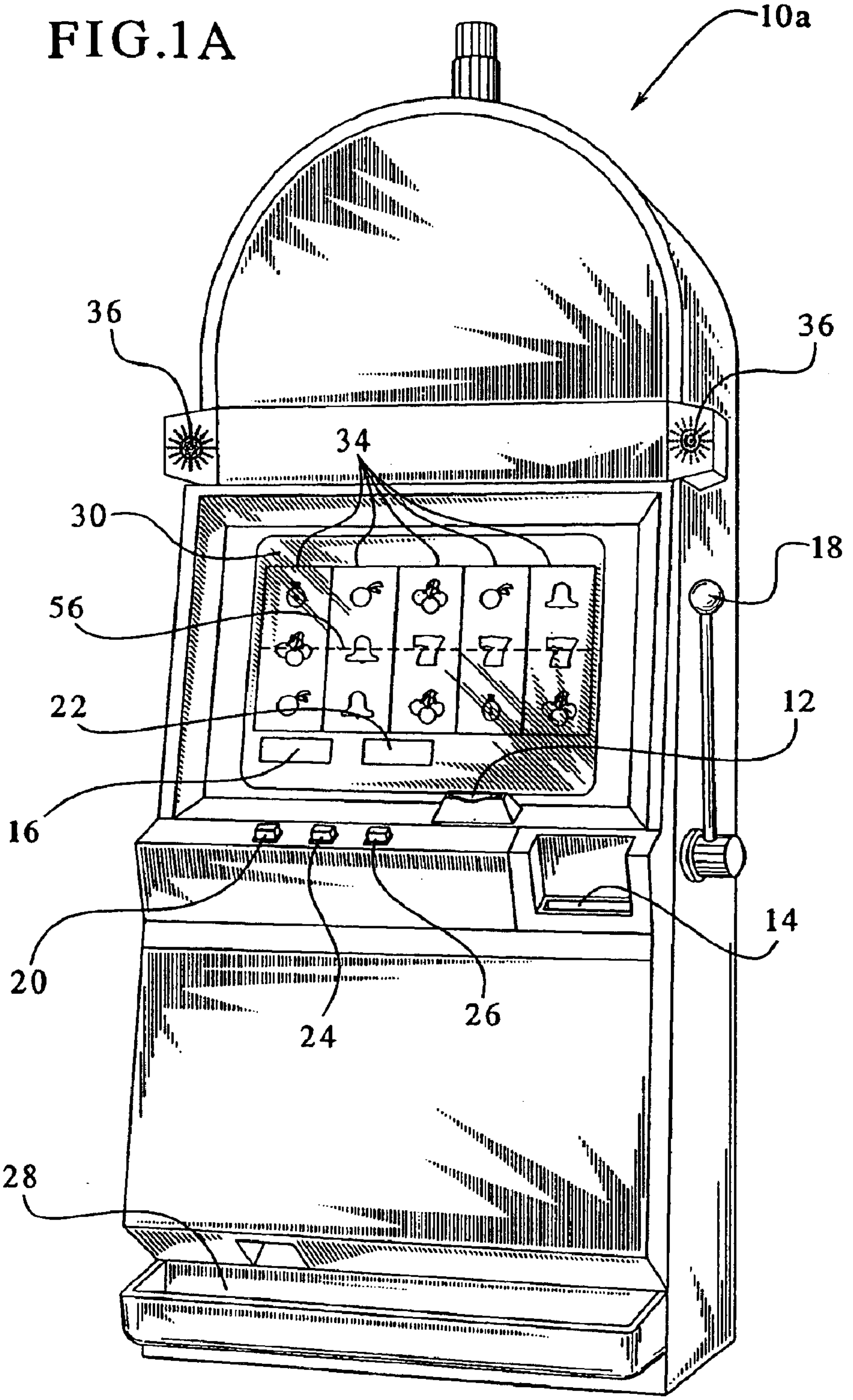
FIG. 1A is a perspective view of one embodiment of the gaming device of the present invention.
Figure 1B:
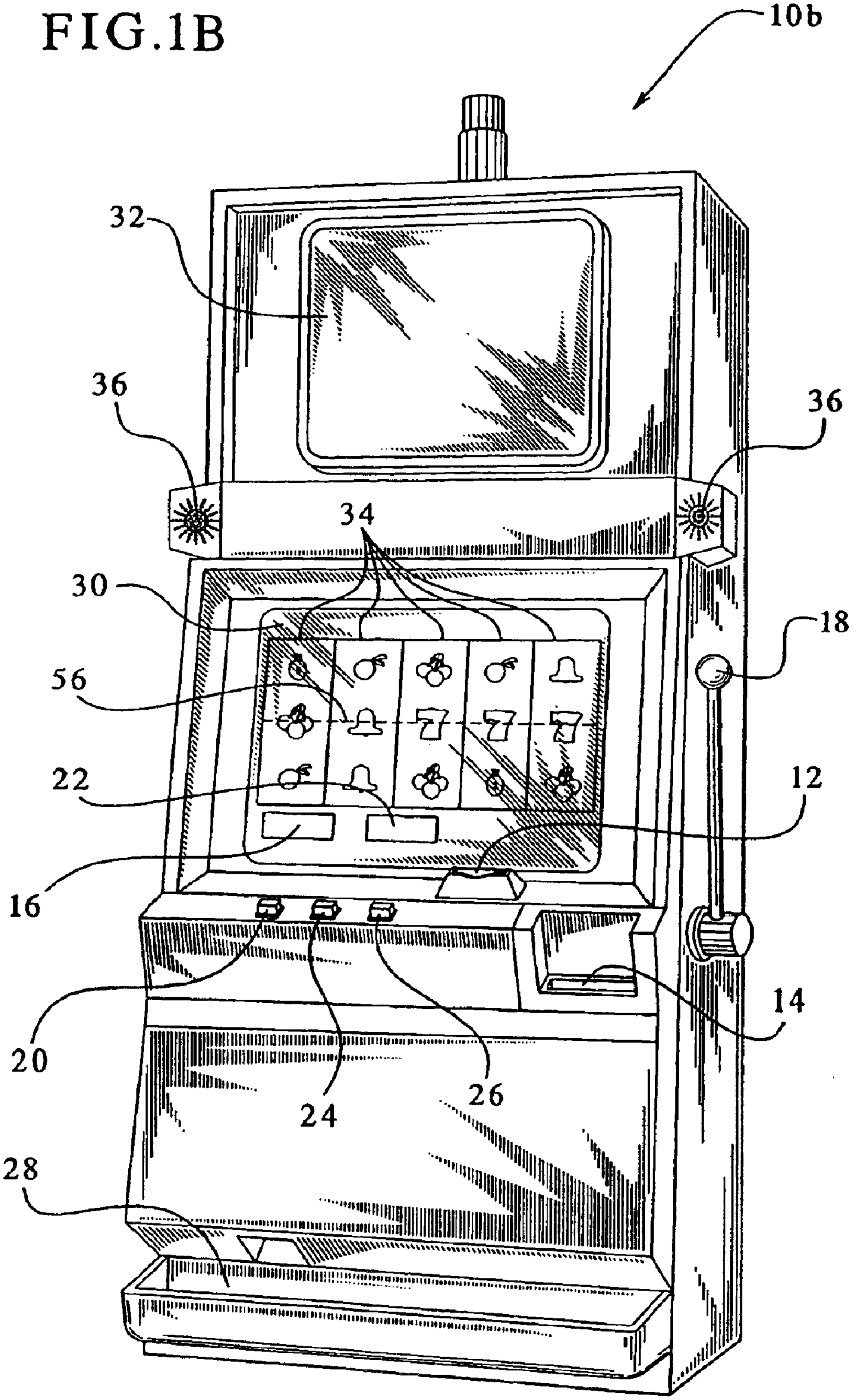
FIG. 1B is a perspective view of another embodiment of the gaming device of the present invention.

Referring now to the drawings, two embodiments of the gaming device of the present invention are illustrated in FIGS. 1A and 1B as gaming device 10*a* and gaming device 10*b*, respectively. Gaming device 10*a* and/or gaming device 10*b* are generally referred to herein as gaming device 10. Gaming device 10 is preferably a slot machine having the controls, displays and features of a conventional slot machine. It is constructed so that a player can operate it while standing or sitting, and gaming device 10 is preferably mounted on a console. However, it should be appreciated that gaming device 10 can be constructed as a pub-style table-top game (not shown) which a player can operate preferably while sitting. Furthermore, gaming device 10 can be constructed with varying cabinet and display designs, as illustrated by the designs shown in FIGS. 1A and 1B. Gaming device 10 can also be implemented as a program code stored in a detachable cartridge for operating a hand-held video game device. Also, gaming device 10 can be implemented as a program code stored on a disk or other memory device which a player can use in a desktop or laptop personal computer or other computerized platform.

Gaming device 10 can incorporate any primary game such as slot, poker or keno, any of their bonus triggering events and any of their bonus round games. The symbols and indicia used on and in gaming device 10 may be in mechanical, electrical or video form.

As illustrated in FIGS. 1A and 1B, gaming device 10 includes a coin slot 12 and bill acceptor 14 where the player inserts money, coins or tokens. The player can place coins in the coin slot 12 or paper money or ticket vouchers in the bill acceptor 14. Other devices could be used for accepting payment such as readers or validators for credit cards or debit cards. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one.

At any time during the game, a player may "cash out" and thereby receive a number of coins corresponding to the number of remaining credits by pushing a cash out button 26. When the player "cashes out," the player receives the coins in a coin payout tray 28. The gaming device 10 may employ other payout mechanisms such as credit slips redeemable by a cashier or electronically recordable cards which keep track of the player's credits.

Gaming device 10 also includes one or more display devices. The embodiment shown in FIG. 1A includes a central display device 30, and the alternative embodiment shown in FIG. 1B includes a central display device 30 as well as an upper display device 32. Gaming device 10 preferably displays a plurality of reels 34, preferably three to five reels 34 in mechanical or video form at one or more of the display devices. However, it should be appreciated that the display devices can display any visual representation or exhibition, including but not limited to movement of physical objects such as mechanical reels and wheels, dynamic lighting and video images. A display device can be any viewing surface such as glass, a video monitor or screen, a liquid crystal display or any other display mechanism. If the reels 34 are in video form, the display device for the video reels 34 is preferably a video monitor.

Each reel 34 displays a plurality of indicia such as bells, hearts, fruits, numbers, letters, bars or other images which preferably correspond to a theme associated with the gaming device 10. Furthermore, gaming device 10 preferably includes speakers 36 for making sounds or playing music.

Figure 2:
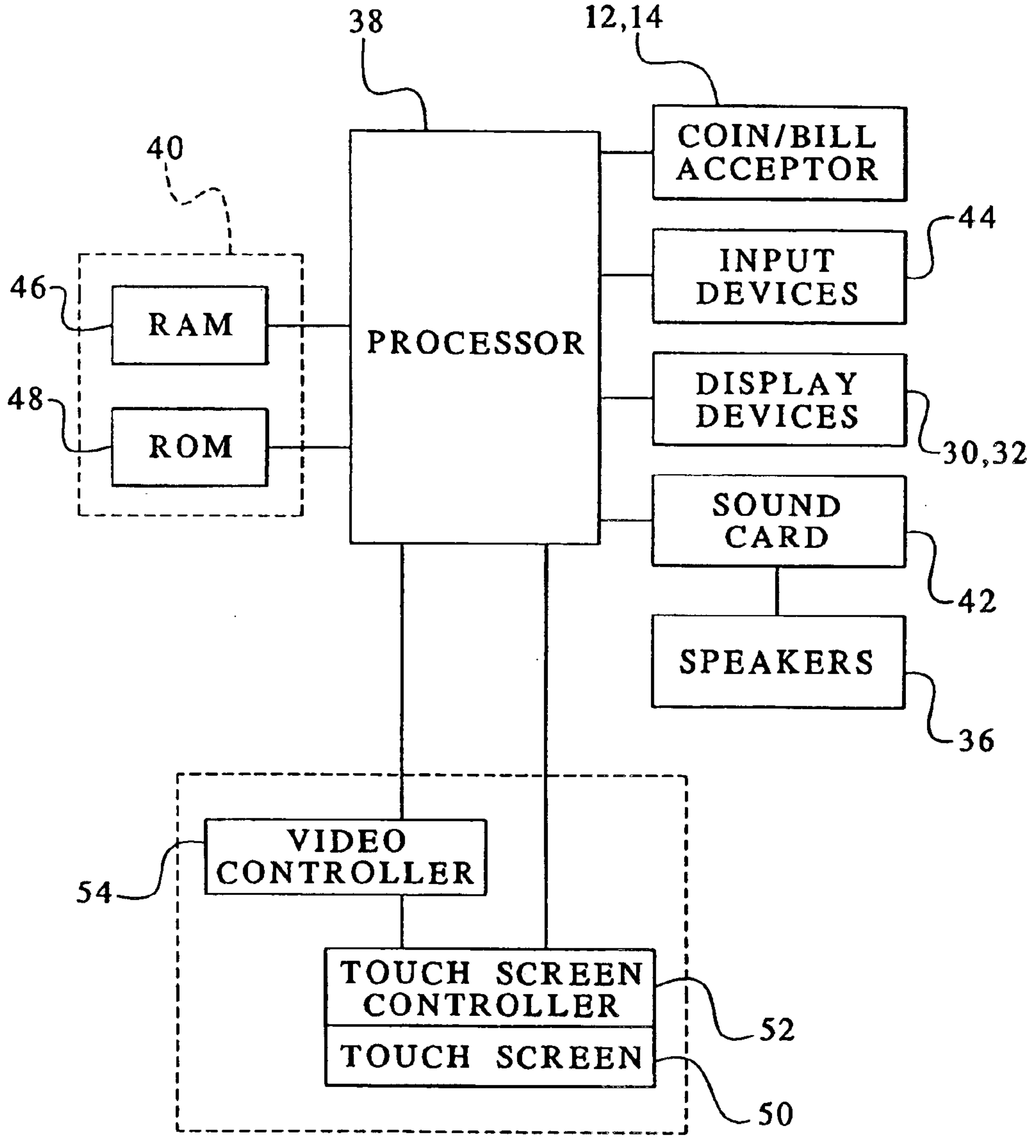
FIG. 2 is a schematic block diagram of the electronic configuration of one embodiment of the gaming device of the present invention.

As illustrated in FIG. 2, the general electronic configuration of gaming device 10 preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 can include random access memory (RAM) 46 for storing event data or other data generated or used during a particular game. The memory device 40 can also include read only memory (ROM) 48 for storing program code which controls the gaming device 10 so that it plays a particular game in accordance with applicable game rules and pay tables.

As illustrated in FIG. 2, the player preferably uses the input devices 44, such as pull arm 18, play button 20, the bet one button 24 and the cash out button 26 to input signals into gaming device 10. In certain instances it is preferable to use a touch screen 50 and an associated touch screen controller 52 instead of a conventional video monitor display device. Touch screen 50 and touch screen controller 52 are connected to a video controller 54 and processor 38. A player can make decisions and input signals into the gaming device 10 by touching touch screen 50 at the appropriate places. As further illustrated in FIG. 2, the processor 38 can be connected to coin slot 12 or bill acceptor 14. The processor 38 can be programmed to require a player to deposit a certain amount of money in order to start the game.

It should be appreciated that although a processor 38 and memory device 40 are preferable implementations of the present invention, the present invention can also be implemented using one or more application-specific integrated circuits (ASIC's) or other hardwired devices, or using mechanical devices (collectively referred to herein as a "processor"). Furthermore, although the processor 38 and memory device 40 preferably reside on each gaming device 10 unit, it is possible to provide some or all of their functions at a central location such as a network server for communication to a playing station such as over a local area network (LAN), wide area network (WAN), Internet connection, microwave link, and the like. The processor 38 and memory device 40 is generally referred to herein as the "computer" or "controller."

With reference to FIGS. 1A, 1B and 2, to operate the gaming device 10 in one embodiment the player must insert the appropriate amount of money or tokens at coin slot 12 or bill acceptor 14 and then pull the arm 18 or push the play button 20. The reels 34 will then begin to spin. Eventually, the reels 34 will come to a stop. As long as the player has credits remaining, the player can spin the reels 34 again. Depending upon where the reels 34 stop, the player may or may not win additional credits.

In addition to winning credits in this manner, preferably gaming device 10 also gives players the opportunity to win credits in a bonus round. This type of gaming device 10 will include a program which will automatically begin a bonus round when the player has achieved a qualifying condition in the game. This qualifying condition can be a particular arrangement of indicia on a display device. The gaming device 10 preferably uses a video-based central display device 30 to enable the player to play the bonus round. Preferably, the qualifying condition is a predetermined combination of indicia appearing on a plurality of reels 34. As illustrated in the five reel slot game shown in FIGS. 1A and 1B, the qualifying condition could be the number seven appearing on three adjacent reels 34 along a payline 56. It should be appreciated that the present invention can include one or more paylines, such as payline 56, wherein the paylines can be horizontal, diagonal or any combination thereof.

Game Scheme

The present invention of the gaming device is a game scheme which can be included in a primary game of a gaming device and/or in a bonus round of a gaming device. In the primary game, the game scheme begins when the player deposits the appropriate amount of money in the gaming device and activates the necessary input devices to initiate the primary game. When the game scheme is included in a bonus round, the game scheme begins when the player achieves a bonus triggering or qualifying condition while playing the primary game of the gaming device.

The game scheme of the present invention includes a plurality of parent regions 100 and a plurality of sub-regions 102. The gaming device displays the sub-regions 102 to the player on one or more display devices. Preferably, the gaming device 10 does not display the parent regions 100 to the player, however, the gaming device 10 can be adapted to do so. The game scheme of the present invention also includes at least one symbol 104 which is displayed by the gaming device so as to indicate a particular sub-region 102. Preferably the symbol 104 indicates a sub-region 102 by being displayed adjacent to, on, or near a sub-region 102. The term symbol, as used herein, means: (i) any physical object; or (b) any visual or audio-visual representation of a person, place or thing, at rest or in motion. Symbol 104 is identified in FIGS. 3 and 4 as an encircled S.

Figures 3, 6:
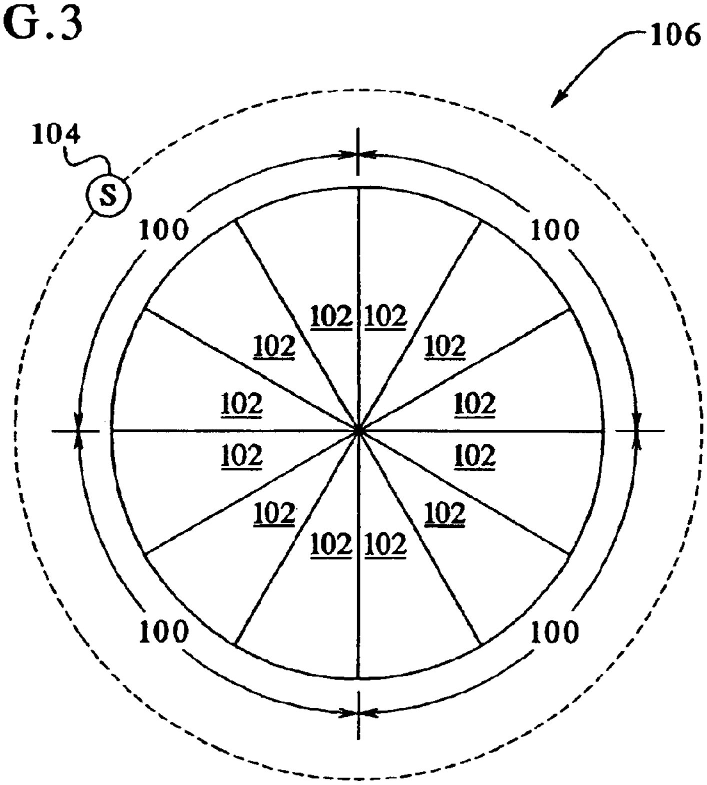
FIG. 3 is a top plan view of one embodiment of present invention.
FIG. 6 is a table of stop probabilities, values and expected values associated with various parent regions in one embodiment of the present invention.

It is preferable that the plurality of parent regions 100 are adjoined and consequently the sub-regions 102 together form a continuous course. As shown in FIG. 3, this course may take the form of a wheel 106. This wheel 106 includes four parent regions 100 which adjoin one another and together constitute three hundred sixty degrees. Each parent region 100 includes within it three sub-regions 102. Also shown here is symbol 104, and the movement of symbol 104 is indicated by the circular dotted line shown in FIG. 3. Symbol 104 is shown at a particular location in FIG. 3. However, symbol 104 can be positioned anywhere along the dotted line or anywhere on or near wheel 106.

Figure 4:
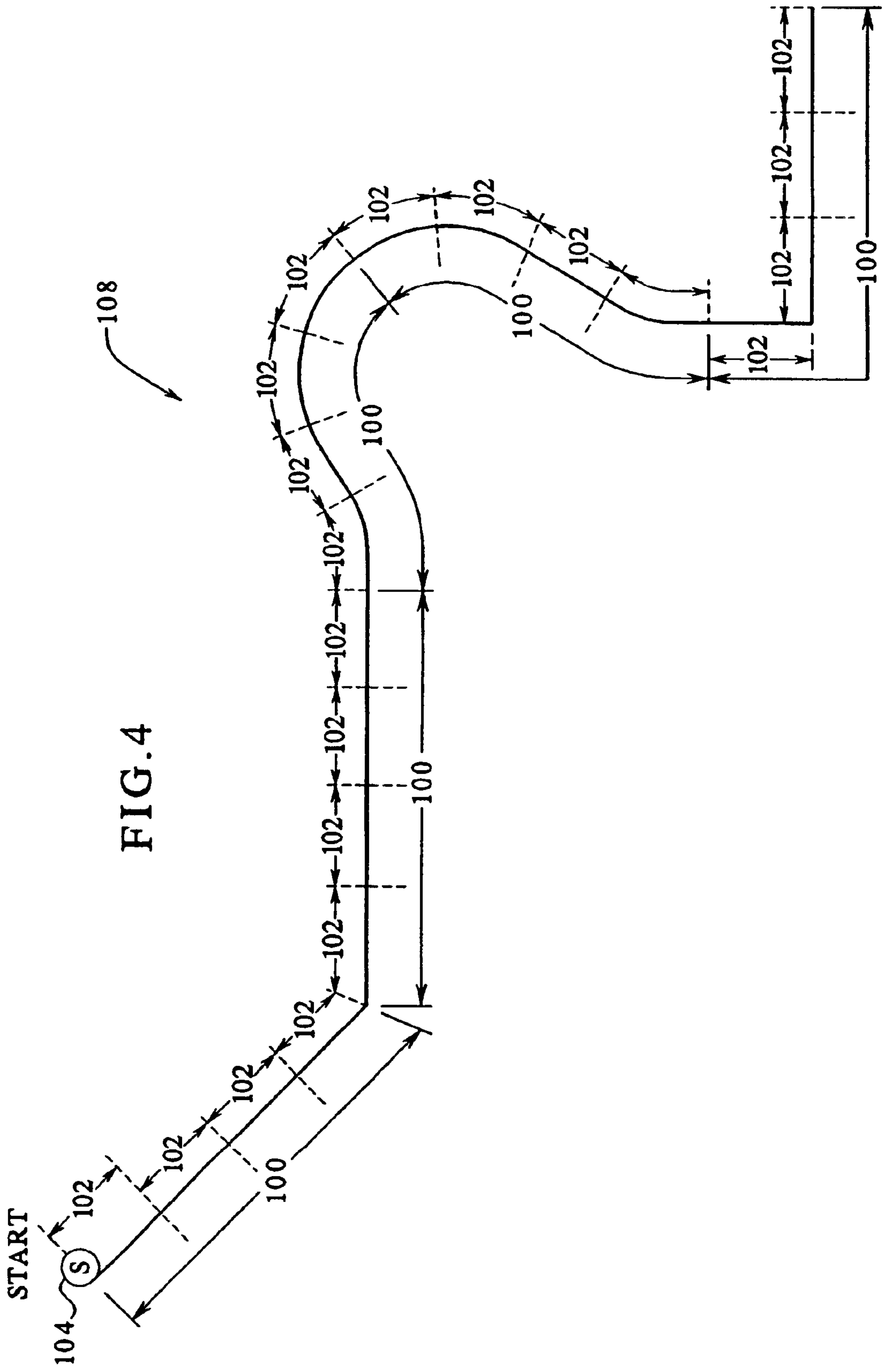
FIG. 4 is a top plan view of another embodiment of the present invention.

The parent regions 100 and sub-regions 102 can also take the form of a path 108, as shown in FIG. 4. Path 108 can include sub-regions 102 of any particular dimension, size or shape. Here, they are illustrated as line segments. Furthermore, path 108, as shown in FIG. 4, takes on a variety of different shapes, including a slope portion, a horizontal portion, a curved portion and a vertical portion. A path 108 can include one or more of these portions or other configurations. As shown in FIG. 4, symbol 104 begins at the upper left-hand corner of path 108. However, symbol 104 can begin at any location along the path 108.

The parent regions 100 and sub-regions 102 shown in FIGS. 3 and 4 are all adjoined. However, in alternative embodiments, one or more of the parent regions 100 and/or sub-regions 102 can be separated from one another. Furthermore, the separated regions can be displayed by the gaming device in any orderly arrangement or disorderly fashion. In addition, in these types of embodiments, symbol 104 may move and indicate various sub-regions 102 in a logical fashion according to the spatial position of the sub-regions 102 with no regard to such spatial position or in any random fashion or any other fashion.

When symbol 104 is described herein as moving or in motion, this means that the gaming device is performing one of the following movement exhibitions: (a) physically moving symbol 104; (b) moving symbol 104 in video form or virtual form; (c) carrying out a dynamic lighting scheme so as to create the illusion or impression that symbol 104 is moving; (d) not moving symbol 104 but instead moving at least one background of symbol 104; (e) spinning wheel 106 adjacent to a non-moving symbol 104; and (f) carrying out any functions which otherwise simulate movement of symbol 104.

Figure 5:
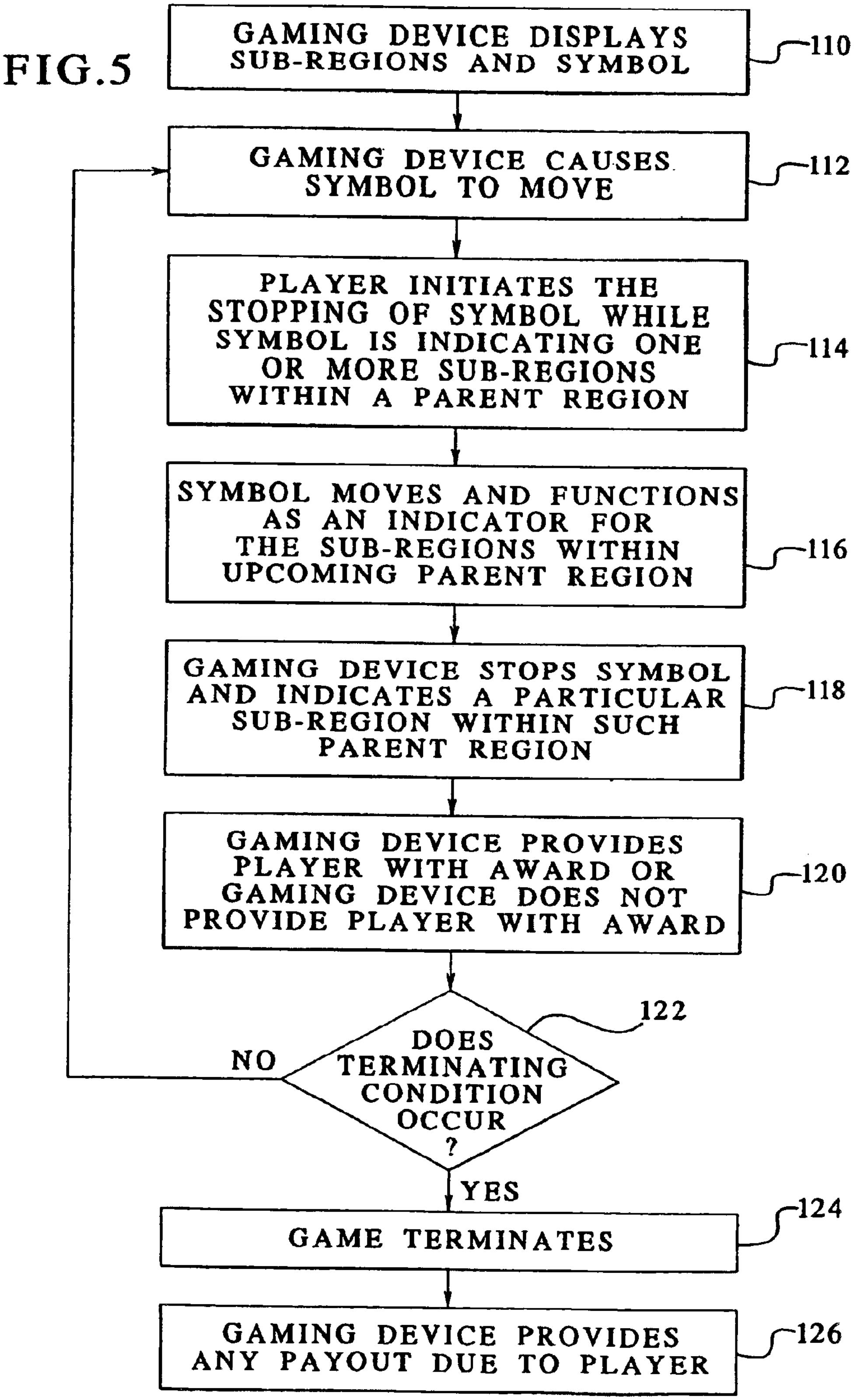
FIG. 5 is a flow diagram of one embodiment of the present invention.

With reference to FIG. 5, in operation the gaming device initially displays the sub-regions 102 and symbol 104 to the player as indicated by block 110. Simultaneously with such display or shortly after such display, the gaming device causes symbol 104 to move, as indicated by block 112. The gaming device can cause symbol 104 to move by automatically doing so according to a predetermined program of the gaming device's computer, or the gaming device can enable the player to activate an input device, such as play button 20, thereby causing symbol 104 to move.

In any case, once symbol 104 is moving the player can initiate the stopping of symbol 104 while the symbol is indicating one or more sub-regions 102 within a parent region 100, as indicated by block 114 in FIG. 5. The gaming device enables the player to judge the speed of symbol 104 and the size of sub-regions 102 and use this information along with the player's hand-eye coordination to skillfully initiate the stopping of symbol 104. Preferably, the parent regions 100 are not displayed to the player, and it appears to the player that the player has the ability to stop symbol 104 and indicate a desired sub-region 102.

As indicated by block 116 in FIG. 5, after the player initiates the stopping of symbol 104, the symbol 104 then continues to move until it functions as an indicator for the sub-regions 102 within the upcoming parent region 100. There the gaming device stops symbol 104 and indicates a particular sub-region 102 within such parent region 100 as indicated by block 118. Where symbol 104 stops and which sub-region 102 the symbol 104 indicates is determined according to a mathematical calculation performed by the computer of the gaming device. The gaming device can perform this calculation before or during the operation of the game.

The game scheme of the present invention also includes one or more awards associated with one or more of the sub-regions 102. The gaming device informs the player of the value of the awards in some fashion, preferably by visually displaying a numeric value, a bonus indicator or otherwise on the display device. The gaming device may accomplish this by displaying a table of awards which corresponds to the sub-regions 102, by using the size of the sub-regions 102 relative to one another, by using the color of the sub-regions 102 relative to one another or by using any other technique. However, preferably the gaming device informs the player of the award value by displaying a message on or near the sub-regions 102. These messages (not shown) can include numeric values, text or graphics.

With reference to FIG. 6, the mathematical calculation involves stop probabilities indicated with the notation "P," preferable numeric values indicated with the notation "V" and expected values. The example shown in FIG. 6 illustrates a calculation involving four parent regions 100 indicated as A, B, C and D. Each parent region 100 includes within it three sub-regions 102. Each sub-region 102 has its own stop probability which, as shown, may or may not vary from sub-region to sub-region. In addition, each sub-region 102 is associated with an award. In the example shown in FIG. 6, the award is a numeric value. The gaming device stops the symbol 104 and indicates a particular sub-region 102 by taking into account the stop probabilities. As illustrated in FIG. 6, the sum of the stop probabilities for each sub-region 102 within each parent region 100 is one hundred percent. Therefore, it is certain that the gaming device will stop the symbol 104 and indicate a sub-region 102 within the upcoming parent region 100, as discussed above. The varying stop probabilities for each sub-region 102 enable the gaming device to be configured so that there is a relatively low likelihood that symbol 104 will stop and indicate a sub-region 102 associated with a relatively high award or value. Likewise, the gaming device can be configured so that there is a relatively high likelihood that symbol 104 will stop and indicate a sub-region 102 associated with a relatively low award or value. Furthermore, the gaming device can be designed so that the expected value associated with each parent region 100 can be the same or substantially the same. As discussed earlier, the expected value is the sum of the products of the stop probabilities and awards associated with each sub-region 102 within a parent region 100.

For example, the expected value calculation for parent region A in FIG. 6 was calculated in the following manner: $[(10\%\times100)+(30\%\times40)+(60\%\times20)=34]$. Preferably, the gaming device does not inform the player of the stop probabilities associated with the sub-regions 102. Instead, the gaming device preferably only informs the player of the various awards associated with sub-regions 102. Furthermore, it is preferable that the gaming device moves symbol 104 at a predetermined rate such that the player is unable to detect that the gaming device enables symbol 104 to move so as to indicate a sub-region within the upcoming parent region 100, where the gaming device determines the sub-region at which the symbol 104 will stop based upon this mathematical calculation.

As illustrated in FIG. 6, the sub-regions 102 can be associated with values which vary greatly in magnitude. For example, in parent region D, its sub-region one is associated with a value of one thousand five hundred and its sub-region three is associated with a value of two. Here, it is expected that the player will attempt to reach sub-region one. However, preferably unbeknownst to the player, the player only has a two percent likelihood of reaching this relatively large value. Furthermore, although values associated with sub-regions may vary greatly, the expected values for each parent region 100 vary only slightly. The expected values for each of the parent regions 100 set forth in FIG. 6 vary by no more than one and six tenths of one percent.

Referring again to FIG. 5, once the gaming device stops the symbol 104 and indicates a particular sub-region 102, the gaming device may or may not provide the player with an award, as indicated by block 120. Whether or not the gaming device provides an award is preferably predetermined by the computer programming of the gaming device. However, this determination can also be made randomly by the computer of the gaming device during the game. In addition, as indicated by diamond 122, a terminating condition may or may not occur at this point. A terminating condition can be any event or sequence of events which occur during the game which cause the game to terminate. Preferably, one terminating condition is the player initiating the stopping of symbol 104 a predetermined number of times. However, the gaming device can include any other terminating condition, and this condition can be predetermined or determined during the game. At this point, if a terminating condition does occur, the game terminates as indicated by block 124. Finally, as indicated by block 126, the gaming device provides the player with any payout due to the player.

The game scheme of the present invention provides a symbol moving along a plurality of sub-regions. A plurality of parent regions each include two or more of these sub-regions. The gaming device provides players with the opportunity to use their skill to cause a symbol to stop moving. Where the symbol stops ultimately determines how great of an award the player gains. It is expected that the player will seek to stop the symbol so that the symbol indicates certain sub-regions which are associated with relatively high awards. However, although the gaming device enables the player to use his or her skill to cause a symbol to stop and indicate a sub-region within a particular parent region (i.e., to pick a parent region), the gaming device does not enable the player to use his or her skill to control which sub-region the symbol will indicate. It is preferable that this inability to skillfully control the ultimate indication of the symbol is undisclosed. This type of game scheme enables players to become involved in skill-based activities in gaming devices while not being able to use their skills to achieve desired payouts.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is hereby claimed as follows:

1. A gaming device having a game operable upon a wager, the gaming device comprising:

a plurality of parent regions;

a plurality of sub-regions within each of the parent regions;

a plurality of different awardable values associated with the sub-regions, each of the parent regions having an expected value based on the awardable values associated with the sub-regions of said parent region, wherein a plurality of the expected values are identical or substantially identical;

a symbol;

an input device which is operable to receive a player input; and a display device operable to display: (a) the awardable values to a player; (b) the symbol moving relative to the sub-regions before the player input occurs; (c) the symbol having a position at or adjacent to one of the sub-regions within one of the parent regions while the player input occurs; and (d) the symbol stopped at a position indicating one of the sub-regions in a different one of the parent regions after the player input occurs, wherein: (i) the player receives the awardable value associated with said sub-region; (ii) said player input is used in determining the different parent region; and (iii) said sub-region indicated within said different parent region is randomly determined.

2. The gaming device of claim 1, wherein the game includes an outcome selected from the group consisting of an award based on one of the awardable values, a bonus round, a bonus event and an opportunity to gain an award based on one of the awardable values.

3. The gaming device of claim 1, which includes a plurality of different game outcomes associated with a plurality of the sub-regions.

4. The gaming device of claim 1, which includes a game outcome associated with each of the sub-regions.

5. The gaming device of claim 1, wherein the player input is a sole parameter used in determining the different parent region.

6. The gaming device of claim 1, which includes at least one designated parameter used in conjunction with the player input in determining the different parent region.

7. The gaming device of claim 1, wherein the player input includes a player selection of one of the sub-regions.

8. The gaming device of claim 1, wherein at least one of the parent regions is adjacent to another one of the parent regions.

9. The gaming device of claim 1, wherein the display device has an electronic configuration adapted to receive inputs from a processor.

10. The gaming device of claim 1, wherein the display device has an electronic configuration adapted to receive inputs through a network.

11. The gaming device of claim 10, wherein the network is selected from the group consisting of a playing station network, a local area network, a wide area network and an internet.

12. The gaming device of claim 1, wherein a plurality of the awardable values vary by a designated percentage and a plurality of expected values vary by a percentage which is greater than zero and less than said designated percentage.

13. A gaming device having a game operable upon a wager, the gaming device comprising:

a first group of regions;

a second group of regions;

a plurality of different awardable values associated with the regions of the first group and the second group;

a first expected value associated with the first group and a second expected value associated with the second group, the first expected value being identical or substantially identical to the second expected value;

a symbol;

an input device operable to receive a player input; and a display device operable to display: (a) the awardable values to a player; (b) the symbol moving relative to the regions before the player input occurs; (c) the symbol having a position at or adjacent to one of the regions of the first group while the player input occurs; and (c) the symbol stopped at a position indicating one of the different regions of the second group after the player input occurs, wherein: (i) the player receives the awardable value associated with the indicated different region of the second group; (ii) the player input is used in determining the second group; and (iii) the indicated different region of the second group is randomly determined.

14. The gaming device of claim 13, wherein the game includes an outcome selected from the group consisting of an award based on one of the awardable values, a bonus round, a bonus event and an opportunity to gain an award based on one of the awardable values.

15. The gaming device of claim 13, which includes a plurality of different game outcomes associated with the regions of the first group and the second group.

16. The gaming device of claim 13, which includes a game outcome associated with each of the regions.

17. The gaming device of claim 13, wherein the player input is a sole parameter used in determining the second group.

18. The gaming device of claim 13, wherein the player input includes a player selection of one of the regions of the first group.

19. The gaming device of claim 13, wherein the display device has an electronic configuration adapted to receive input from a processor.

20. The gaming device of claim 13, wherein the display device has an electronic configuration adapted to receive input through a network.

21. The gaming device of claim 20, wherein the network is selected from the group consisting of a playing station network, a local area network, a wide area network and an internet.

22. The gaming device of claim 13, which includes a stop probability associated with each of the regions.

23. The gaming device of claim 13, which includes a designated parameter used in conjunction with the player input in determining the second group.

24. The gaming device of claim 13, wherein a plurality of the awardable values vary by a designated percentage and a plurality of expected values vary by a percentage which is greater than zero and less than said designated percentage.

25. A gaming device having a game operable upon a wager, the gaming device comprising:

a first group of regions;

a second group of regions;

a plurality of different awardable values associated with the regions of the first group and the second group;

a first expected value associated with the first group and a second expected value associated with the second group, the first expected value being identical or substantially identical to the second expected value;

a symbol;

an input device operable to receive a player input; and a display device operable to display: (a) the awardable values to a player; (b) the symbol moving relative to the regions before the player input occurs; (c) the symbol having a position at or adjacent to one of the regions of the first group while the player input occurs; and (d) the symbol stopped at a position indicating a different one of the regions of the second group after the player input occurs, wherein: (i) the player receives the awardable value associated with the indicated different region; (ii) the player input is used in determining the second group; and (iii) the indicated different region of the second group is randomly determined.

26. The gaming device of claim 25, wherein the game outcome includes an outcome selected from the group consisting of an award based on one of the awardable values, a bonus round, a bonus event and an opportunity to gain an award based on one of the awardable values.

27. The gaming device of claim 25, which includes a plurality of different game outcomes associated with the regions of the first group and the second group.

28. The gaming device of claim 25, which includes a game outcome associated with each of the regions.

29. The gaming device of claim 25, wherein the player input is a sole parameter used in determining the second group.

30. The gaming device of claim 25, which includes a designated parameter used in conjunction with the player input in determining the second group.

31. The gaming device of claim 25, wherein the first region is at or adjacent to the second group.

32. The gaming device of claim 25, wherein the display device has an electronic configuration adapted to receive input from a processor.

33. The gaming device of claim 25, wherein the display device has an electronic configuration adapted to receive input through a network.

34. The gaming device of claim 33, wherein the network is selected from the group consisting of a playing station network, a local area network, a wide area network and an internet.

35. The gaming device of claim 25, wherein a plurality of the awardable values vary by a designated percentage and the first expected value and the second expected value vary by a percentage which is greater than zero and less than said designated percentage.

36. A gaming device having a game operable upon a wager, the gaming device comprising:

a path including a plurality of parent regions, each of the parent regions including a plurality of sub-regions;

a plurality of different awardable values associated with the sub-regions, each of the parent regions having an expected value, based on the awardable values associated with the sub-regions of said parent region, wherein a plurality of the expected values are identical or substantially identical;

a sub-region indicator adapted to indicate the sub-regions along the path;

an input device operable to receive a player input; and a display panel operable to display: (a) the awardable values to a player; (b) the sub-region indicator moving along the path before the player input occurs; (c)the sub-region indicator having a position at or adjacent to one of the sub-regions in one of the parent regions while the player input occurs; and (d) the sub-region indicator stopped at a position indicating a different one of the sub-regions in a different parent region after the player input occurs, wherein: (i) the player input is used in determining the different parent region; (ii) said sub-region indicated within the different parent region is randomly determined; and (iii) the player receives the awardable value associated with said indicated different sub-region.

37. The gaming device of claim 36, wherein the game includes an outcome selected from the group consisting of an award based on one of the awardable values, a bonus round, a bonus event and an opportunity to gain an award based on one of the awardable values.

38. The gaming device of claim 36, which includes a plurality of different game outcomes associated with a plurality of the sub-regions.

39. The gaming device of claim 36, which includes a game outcome associated with each of the sub-regions.

40. The gaming device of claim 36, wherein the player input is a sole parameter used in determining the different parent region, said determination resulting in a random determination of the indicated different sub-region within said different parent region.

41. The gaming device of claim 36, which includes a designated parameter used in conjunction with the player input in determining the different parent region, said determination resulting in a random determination of the indicated different sub-region within said different parent region.

42. The gaming device of claim 36, wherein the player input includes a player selection of one of the sub-regions.

43. The gaming device of claim 36, wherein the display device has an electronic configuration adapted to receive input mm a processor.

44. The gaming device of claim 36, wherein the display device has an electronic configuration adapted to receive input through a network.

45. The gaming device of claim 44, wherein the network is selected from the group consisting of a playing station network, a local area network, a wide area network and an internet.

46. The gaming device of claim 36, wherein a plurality of the awardable values vary by a designated percentage and a plurality of expected values vary by a percentage which is greater than zero and less than said designated percentage.

47. A gaming device having a game operable upon a wager, the gaming device comprising:

a path including a plurality of parent regions;

a plurality of sub-regions in each of the parent regions;

a plurality of different awardable values associated with the sub-regions, each of the parent regions having an expected value based on the awardable values associated with the sub-regions of said parent region, wherein a plurality of the expected values are identical or substantially identical;

a sub-region indicator operable to indicate the sub-regions along the path;

an input device operable to enable a player to select one of the parent regions; and a display panel operable to display: (a) the awardable values to the player; (b) the sub-region indicator moving along the path before the player selection occurs; (c)the sub-region indicator having a position at or adjacent to one of the parent regions while the player selection occurs; and (d) the sub-region indicator stopped at a position indicating one of the sub-regions in a different one of the parent regions after the player selection occurs, wherein: (i) the player selection is used in determining the different parent region; (ii) said indicated sub-region is randomly determined; and (iii) the player receives the awardable value associated with said indicated sub-region.

48. The gaming device of claim 47, wherein the game outcome includes an outcome selected from the group consisting of an award based on one of the awardable values, bonus round, a bonus event and an opportunity to gain an award based on one of the awardable values.

49. The gaming device of claim 47, which includes a plurality of different game outcomes associated with a plurality of the sub-regions.

50. The gaming device of claim 47, which includes a game outcome associated with each of the sub-regions.

51. The gaming device of claim 47, wherein the player input is a sole parameter used in determining the different parent region, said determination resulting in a random determination of the indicated sub-region within said different parent region.

52. The gaming device of claim 47, which includes a designated parameter used in conjunction with the player input in determining the different parent region, said determination resulting in a random determination of the indicated sub-region within said different parent region.

53. The gaming device of claim 47, wherein the display device has an electronic configuration adapted to receive input from a processor.

54. The gaming device of claim 47, wherein the display device has an electronic configuration adapted to receive input through a network.

55. The gaming device of claim 54, wherein the network is selected from the group consisting of a playing station network, a local area network, a wide area network and an internet.

56. The gaming device of claim 47, wherein a plurality of the awardable values vary by a designated percentage and a plurality of expected values vary by a percentage which is greater than zero and less than said designated percentage.

57. A gaming device having a game operable upon a wager, the gaming device comprising:

a path including a plurality of parent regions, each of the parent regions including a plurality of sub-regions;

a sub-region indicator operable to indicate the sub-regions along the path;

a plurality of different awardable values associated with the sub-regions, each of the parent regions having an expected value based on the awardable values associated with the sub-regions of said parent region, wherein a plurality of the expected values are identical or substantially identical;

an input device operable to receive a player input; and a display panel operable to display: (a) the awardable values to a player; (b) the sub-region indicator moving along the path before the player input occurs; (c)the sub-region indicator having a position at or adjacent to one of the sub-regions in one of the parent regions while the player input occurs; and (d) the sub-region indicator stopped at a position indicating a different one of the sub-regions in a different parent region after the player input occurs, wherein: (i) the player input is used in determining the different parent region; (ii) said sub-region indicated In said parent region is randomly determined; and (iii) the player receives the awardable value associated with said indicated sub-region.

58. The gaming device of claim 57, wherein the game includes an outcome selected from the group consisting of an award based on one of the awardable values, a bonus round, a bonus event and an opportunity to gain an award based on one of the awardable values.

59. The gaming device of claim 57 includes a plurality of different game outcomes associated with a plurality of the sub-regions.

60. The gaming device of claim 57, which includes a game outcome associated with each of the sub-regions.

61. The gaming device of claim 57, wherein the player input is a sole parameter used in determining the different parent region, said determination resulting in a random determination of the indicated sub-region within said different parent region.

62. The gaming device of claim 57, which includes a designated parameter used in conjunction with the player input in determining the different parent region, said determination resulting in a random determination of the indicated sub-region within said different parent region.

63. The gaming device of claim 57, wherein the player input includes a player selection of one of the sub-regions.

64. The gaming device of claim 57, wherein the display device has an electronic configuration adapted to receive input from a processor.

65. The gaming device of claim 57, wherein the display device has an electronic configuration adapted to receive input through a network.

66. The gaming device of claim 65, wherein the network is selected from the group consisting of a playing station network, a local area network, a wide area network and an internet.

67. The gaming device of claim 57, wherein a plurality of the awardable values vary by a designated percentage and a plurality of expected values vary by a percentage which is greater than zero and less than said designated percentage.

68. A gaming device having a game operable upon a wager, the gaming device comprising:

a path including a first group of regions and a second group of regions;

a plurality of different awardable values associated with the regions of the first group and the second group;

a first expected value associated with the first group and, a second expected value associated with the second group, the first expected value being identical or substantially identical to the second expected value;

a symbol;

an input device operable to receive a player input; and a display device which, at one time, displays the symbol moving relative to the path and the awardable values while a player makes the player input when the symbol is indicating one of the regions of the first group, and at a subsequent time, displays the symbol indicating a different one of the regions of the second group, wherein: (i) the player input is used in determining the second group; (ii) said indicated different region indicated in the second group is randomly determined; and (iii) the player receives the awardable value associated with said indicated different region.

69. The gaming device of claim 68, wherein the game includes an outcome selected from the group consisting of an award based on one of the awardable values, a bonus round, a bonus event and an opportunity to gain an award based on one of the awardable values.

70. The gaming device of claim 68, which includes a plurality of different game outcomes associated with the regions.

71. The gaming device of claim 68, which includes a game outcome associated with each of the different regions.

72. The gaming device of claim 68, wherein the player input is a sole parameter used in determining the second group, said determination resulting in a random determination of the indicated different region of said second group.

73. The gaming device of claim 68, which includes a designated parameter used in conjunction with the player input in determining the second group, said determination resulting in a random determination of one of the indicated different region of the second group.

74. The gaming device of claim 68, wherein the player input includes a player selection of one of the regions of the first group.

75. The gaming device of claim 68, wherein the subsequent time occurs after the player input occurs.

76. The gaming device of claim 68, wherein the display device has an electronic configuration adapted to receive input from a processor.

77. The gaming device of claim 68, wherein the display device has an electronic configuration adapted to receive input through a network.

78. The gaming device of claim 77, wherein the network is selected from the group consisting of a playing station network, a local area network, a wide area network and an internet.

79. The gaming device of claim 68, wherein a plurality of the awardable values vary by a designated percentage and the first expected value and the second expected value vary by a percentage which is greater than zero and less than said designated percentage.

80. A method of operating a gaming device having a game operable upon a wager, the method comprising:

(a) initiating the game;

(b) providing a plurality of parent regions;

(c) displaying a plurality of sub-regions in one of the parent regions and displaying at least one sub-region in another one of the parent regions;

(d) displaying a plurality of different awardable values in association with the sub-regions, each of the parent regions having an expected value based on the awardable values associated with the sub-regions of said parent region, wherein a plurality of the expected values are identical or substantially identical;

(e) displaying movement of a symbol relative to the parent regions;

(f) enabling a player input to occur while the symbol is at or adjacent to one of the sub-regions in one of the parent regions;

(g) using the player input in determining a different one of the parent regions;

(h) randomly determining one of the sub-regions in the different parent region;

(i) displaying the symbol stopped at a position so as to indicate one of the sub-regions in the different parent region; and (j) providing the player with the awardable value associated with said sub-region within the different parent region.

81. The method of claim 80, wherein the step of providing a game outcome includes the step of providing an outcome selected from the group consisting of an award, a bonus round, a bonus event and an opportunity to gain an award.

82. The method of claim 80, which includes the step of providing a plurality of different game outcomes associated with a plurality of the sub-regions.

83. The method of claim 80, which includes the step of providing a game outcome associated with each of the sub-regions.

84. The method of claim 80, wherein the step of using the player input in determining the different parent region includes the step of enabling the player input to be a sole parameter in determining the different parent region, said determination resulting in a random determination of the sub-region within said different parent region.

85. The gaming device of claim 80, wherein the step of using the player input in determining the different parent region includes the step of using a designated parameter in conjunction with the player input to determine the different parent region, said determination resulting in a random determination of the sub-region different parent region.

86. The method of claim 80, wherein the step of enabling a player input to occur includes the step of enabling a player to select one of the sub-regions.

87. The method of claim 80, which includes the step of communicating with a processor.

88. The method of claim 80, which includes the step of receiving signals through a network.

89. The method of claim 80, which includes the step of receiving signals through a network selected from the group consisting of a playing station network, a local area network, a wide area network and an internet.

90. The method of claim 80, wherein step (d) includes the steps of: (i) displaying a plurality of awardable values which vary by a designated percentage; and (ii) providing a plurality of expected values which vary by a percentage which is greater than zero and less than said designated percentage.

91. A method of operating a gaming device having a game operable upon a wager, the method comprising:

(a) initiating the game;

(b) providing a plurality of parent regions;

(c) displaying a plurality of sub-regions within each of the parent regions;

(d) displaying a plurality of different awardable values associated with the sub-regions, each of the parent regions having an expected value based on the awardable values associated with the sub-regions of said parent region, wherein a plurality of the expected values are identical or substantially identical;

(e) displaying movement of a symbol relative to the parent regions and the sub-regions;

(f) enabling a player input to occur while the symbol is at or adjacent to one of the sub-regions in one of the parent regions;

(g) using the player input in determining a different one of the parent regions;

(h) randomly determining one of the sub-regions in the different parent region;

(i) displaying the symbol stopped at a position so as to indicate said sub-region in the different parent region ; and (j) providing the player with the awardable value associated with said sub-region.

92. The method of claim 91, wherein the step of enabling a player input to occur includes the step of enabling a player to select one of the sub-regions.

93. The method of claim 91, wherein the step of enabling a player input to occur determines one of the parent regions, said determination resulting in a random determination of one of the sub-regions.

94. The gaming device of claim 91, wherein the step of enabling a player input to occur determines one of the sub-regions, said determination resulting in a random determination of one of the parent regions.

95. The method of claim 91, which includes the step of displaying a plurality of different values associated with a plurality of the sub-regions.

96. The method of claim 91, which includes the step of displaying a value associated with each of the sub-regions.

97. The method of claim 91, which includes the step of communicating with a processor.

98. The method of which claim 91, which includes the step of receiving signals through a network.

99. The method of claim 91, which includes the step of receiving signals through a network selected from the group consisting of a playing station network, a local area network, a wide area network and an internet.

100. The method of claim 91, wherein step (d) includes the steps of: (i) displaying a plurality of awardable values which vary by a designated percentage; and (ii) providing a plurality of expected values which vary by a percentage which is greater than zero and less than said designated percentage.

101. A method of operating a gaming device having a game operable upon a wager, the method comprising:

(a) receiving a start signal for the game;

(b) providing a path including a plurality of parent regions;

(c) displaying a plurality of sub-regions in each of the parent regions;

(d) displaying a plurality of awardable values associated with the sub-regions, each of the parent regions having an expected value based on the awardable values associated with the sub-regions of said parent region, wherein a plurality of the expected values are identical or substantially identical;

(e) displaying movement of a symbol relative to the path;

(f) enabling a player input to occur while said symbol is at or adjacent to a first one of the sub-regions in one of the parent regions;

(g) using the player input in determining a different one of the parent regions;

(h) randomly determining a second one of the sub-regions in the different parent region;

(i) displaying the symbol stopped at or adjacent to the second sub-region in the different parent region; and (j) providing to a player the awardable value associated said second sub-region.

102. The method of claim 101, wherein the step of enabling a player input to occur includes the step of enabling a player to select one of the sub-regions.

103. The method of claim 101, wherein the step of enabling a player input to occur includes the step of enabling the player input to be a sole parameter used in determining the different parent region.

104. The gaming device of claim 102, wherein the step of enabling a player input to occur includes the step of using a designated parameter in conjunction with the player input in determining the different parent region.

105. The method of claim 101, which includes the step of providing a plurality of different game outcomes associated with a plurality of the sub-regions.

106. The method of claim 101, which includes the step of providing a game outcome associated with each of the sub-regions.

107. The method of claim 101, wherein step (g) occurs after step (f).

108. The method of claim which 101, includes the step of communicating with a processor.

109. The method of claim 101, which includes the step of receiving signals through a network.

110. The method of claim 101, which includes the step of receiving signals through a network selected from the group consisting of a playing station network, a local area network, a wide area network and an internet.

111. The method of claim 101, wherein step (d) includes the steps of: (i) displaying a plurality of awardable values which vary by a designated percentage; and (ii) providing a plurality of expected values which vary by a percentage which is greater than zero and less than said designated percentage.

* * * * *

UNITED STATES PATENT AND TRADEMARK OFFICE

CERTIFICATE OF CORRECTION

PATENT NO. : 6,918,830 B2
DATED : July 19, 2005
INVENTOR(S) : Anthony J. Baerlocher It is certified that error appears in the above-identified patent and that said Letters Patent is hereby corrected as shown below:

Column 12,
Line 16, change "value," to -- value --.
Line 60, change "mm" to -- from --.

Column 15,
Line 1, change "and," to -- and --.

Signed and Sealed this

Thirteenth Day of December, 2005

JON W. DUDAS
*Director of the United States Patent and Trademark Office*